Feb. 11, 1936.  W. A. YOUNG  2,030,088
GROMMET
Filed April 18, 1934
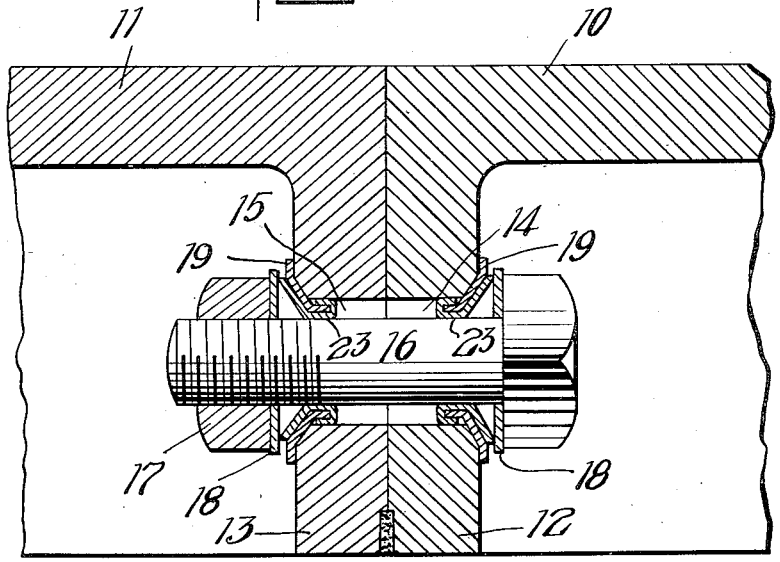
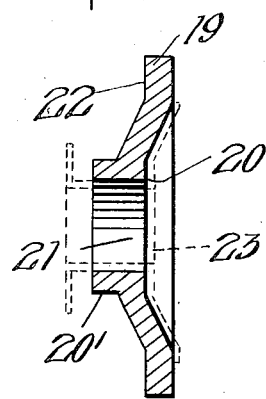
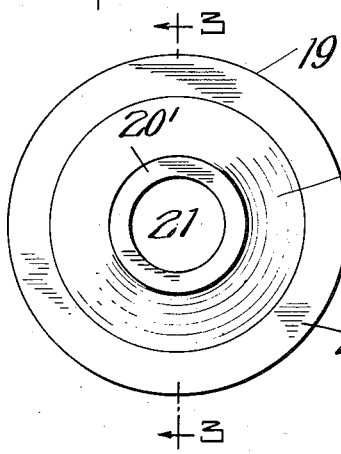
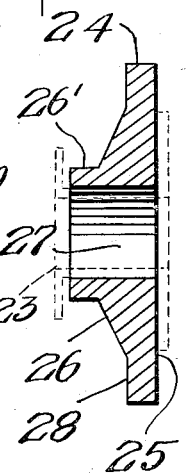
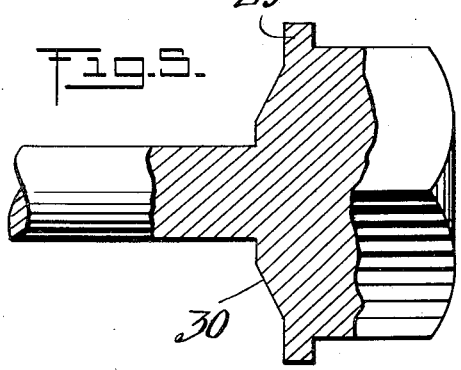
INVENTOR
William A. Young
BY
ATTORNEY

UNITED STATES PATENT OFFICE 2,030,088

GROMMET

William A. Young, Astoria, N. Y.

Application April 18, 1934, Serial No. 721,090

3 Claims. (Cl. 85—1)

Among the principal objects which the present invention has in view are: To provide a grommet whereby leakage of water or the like past bolts as used in sealing plates used in boilers, ships and underwater tunnel construction or the like, is presented; to utilize a peripheral flange on the grommet which will press inwardly towards the sealing plates; to utilize expansion rings of a yielding material subject to compression by the grommet and which with pressure employed will have its ends caused to tightly engage the ends of the grommet; to secure simplicity of construction and to obtain other advantages and results.

Drawing:

Figure 1 is a sectional view of part of plates used in construction of boilers, ships and underwater tunnels or the like and embodying my invention;

Figure 2 is a front view of my improved grommet;

Figure 3 is a sectional view showing the construction of the grommet as taken on line 3—3 of Figure 2;

Figure 4 is a similar view in slightly modified form; and

Figure 5 is a further showing of the grommet as an integral part of the bolt.

As seen in the drawing, I have deemed it advisable to show a pair of plates 10 and 11 having webs or flanges 12 and 13, said flanges abutting each other and sealed in any suitable manner as understood by those skilled in the art of constructing boilers, ships and underwater tunnels or the like. However, calking at the edges of the flanges does not suffice to prevent the danger of water leaking through the joints as far as the bolts and seeping out around the bolts, and it is to more effectively prevent leakage at the bolts that the present invention is directed.

In the construction of boilers, ships and underwater tunnels, it is the usual practice of providing the flanges 12 and 13 of the several plates with openings 14 and 15 which will register when the plates are positioned next to each other. Bolts 16 are passed through the registering holes, said bolts each having at its one end threads as usual to receive a nut 17 thereon. For convenience, the shoulder faces of the bolt head and nut which face each other will be referred to as the inside of said head and nut.

In carrying out the invention, I employ in the preferred construction of Figure 1, washers 18 to rest in use, one at the inside of the bolt head and another at the inside of the nut 17. Furthermore, I provide washer-like expansion members 19 to be applied to the bolt, one next to each said washers. The expansion members are each preferably of sheet steel or other metal of noncorrosive material and pressed or otherwise formed to provide a central portion 20 thereof around the bolt-hole 21 which bulges inwardly from the plane of the outer rim portion 22 of said member. The bulging portion 20 is such that it will tend to force itself into the bolt-hole of the plate flange, and pressure to so force it is applied at the rim portion 22 when the nut 17 is screwed home upon the bolt.

It is to be noted that the central portion 20 provides a longitudinal extension or collar 20', the purpose of which will hereafter be described. As seen in Figure 1, the collar 20' is of less outside diameter than the bolt holes in plates 12 and 13 and has a hole longitudinally through the collar greater in diameter than the outer periphery of the bolt 16, thereby leaving a space inside and outside of the said collar.

In carrying out the invention I furthermore provide relatively soft grommets 23, for instance, of lead, which have much the same shape as the bulging members 19, passing through the hole therein with a radially outwardly extending flange at the end of the collar 20', and having a flared portion to lie against the flared portion of the grommet, though in the instance have not the same peripheral rim as the rim 22 of the grommet 19. In practice it is preferable that said soft grommets be applied between the member 19 and the washer 18. The grommets 23 are relatively thin and of substantially uniform thickness and sufficiently ductile to be curled around the end of collar 20' and pressed into irregularities of the collar and thereby effectively seal the bolt hole against passage of water. It is to be noted that when the grommet is applied to said member 19, the neck of the grommet is of greater length than the hole through said member and that the end flange on the grommet next the end of the collar has a radius greater than the bolt-hole. Therefore, as the nut 17 is screwed down and the member 19 drawn home, said grommet flange is curled around the end of said collar and provides a positive seal between the bolt and bolt-hole as well as between those parts and the member 19, as shown in Figure 1. The compression of the grommet is thus secured at both ends thereof, tightening it both longitudinally and laterally within the hole of member 19 and the hole 14 of the plates. An effective seal against passage of water is accordingly secured.

In Figure 4, I have illustrated a modified construction wherein I have combined the washer and bulging member as a single member 24. In this instance the member is flat, as at 25, for engaging against the head of the bolt 16 or against the nut 17, and at its opposite side bulges, as at 26, next to the central opening 27 and terminating into a longitudinal collar 26'. A peripheral rim 28 is provided beyond the bulge at the opposite end thereof from the longitudinal collar. A soft grommet 23 is shown in dotted lines assuming the position before pressure is applied whereby the flanged end thereof protruding from the collar 26' will then curl around the end of said collar and overlie the outer surface of said collar between it and the wall of the bolt hole.

If so desired, the bolt-head or nut and the member just described may be made integral. This modification is illustrated in Figure 5 wherein the bolt-head (illustrative of either bolt or nut) is provided with an integral rim 29 at its inner side and a bulge 30. In this instance, the grommet would lie between the bulge at the underside of the bolt head and the plate next the bolt hole, and also between the shank of the bolt and the wall of the bolt hole.

I claim:

1. In combination with plates having a bored hole to be held together, a bolt of substantially smaller diameter than the bored holes for securing the same, an expansion member having a flange the inner face thereof engaging the outer walls of one of said plates and providing an inwardly directed flaring portion with a collar to be approximately midway between the outside diameter of the bolt and the inside wall of the bored hole, a grommet of relatively and uniformly thin structure between the bolt-head and the expansion member, said grommet providing means extending beyond and around the said collar for sealing the openings between the bolt and the walls of the hole in the plate.

2. In combination with plates having a bored hole to be held together, a bolt of substantially smaller diameter than the bored holes for securing the same, an expansion member having a flange the inner face thereof engaging the outer walls of one of said plates and providing an inwardly directed flaring portion with a collar to be approximately midway between the outside diameter of the bolt and the inside wall of the bored hole, a grommet of relatively and uniformly thin structure between the bolt-head and the expansion member, said grommet having an inwardly directed flange providing a diameter greater than the collar to snugly fit between the expansion member collar and bolt for sealing the opening between the bolt and the walls of the hole in the plate.

3. In combination with plates having a bored hole to be held together, a bolt of substantially smaller diameter than the bored holes for securing the same, an expansion member having a peripheral flange engaging the outer walls of one of said plates and providing an inwardly directed flaring portion with a collar to be approximately midway between the outside diameter of the bolt and the inside wall of the bored hole, a grommet of relatively and uniformly thin structure between the bolt-head and the expansion member, said grommet having an inwardly directed flange providing a diameter greater than and extending beyond the collar of the expansion member whereby under pressure said flange will bend and curl around the said collar thereby effecting a seal between the bolt and the walls of the hole in the plate.

WILLIAM A. YOUNG.